UNITED STATES PATENT OFFICE.

ERNST ULRICHS, OF ELBERFELD, GERMANY, ASSIGNOR TO THE FIRM OF WÜLFING, DAHL AND COMPANY, A. G., OF BARMEN, GERMANY.

MANUFACTURE OF LAKES.

1,014,539.  Specification of Letters Patent.  Patented Jan. 9, 1912.

No Drawing. Application filed June 1, 1911. Serial No. 630,597.

*To all whom it may concern:*

Be it known that I, ERNST ULRICHS, a subject of the King of Prussia, German Emperor, and resident of Elberfeld, Province of the Rhine, German Empire, have invented new and useful Improvements in the Manufacture of Lakes, of which the following is a specification.

My invention consists in the production of new lakes which are of a beautiful Bordeaux-red shade being at the same time distinguished by their resistance to water and alcohol and their insolubility in oil as well as by the fast color and high covering capacity as oil-colors.

The method of producing my new lakes consists in treating the monoazo dye produced from diazotized alpha-naphthylamin and naphthol-sulfo-acid 1:4 with the salts of heavy metals as for instance calcium, barium, and the like.

The dye produced from diazotized alpha-naphthylamin and naphthol-sulfoacid 1:4 from which my new lakes are made, has already been made known by the German Patent 26012 of the year 1883 (English Patent No. 2237/83). There the dye is mentioned among a series of other dyes, as for instance: azococcin 2R (xylidin and naphtholsulfoacid 1.4) azorubin S or azo acid-rubin (naphthionic acid and naphtholsulfoacid 1:4), azococcin 7B or cloth red R (amidoazobenzene and naphtholsulfoacid 1.4), orseillin B. B. (amido-azo-toluenesulfoacid and naphtholsulfoacid 1.4), each having naphtholsulfoacid 1:4 as one component thereof. While most of these dyes are very valuable for dyeing wool, etc., the dye produced from diazotized alpha-naphthylamin and naphtholsulfo-acid 1:4, being practically insoluble in water, is of no value as a dye and therefore it has never been in the market. I have found, however that the calcium and barium salts, of this dye are of great importance for the manufacture of colorlakes. This fact has been much surprising inasmuch as the other mono azo dyes from naphtholsulfo-acid 1.4 mentioned above are valueless for the manufacture of lakes and as until now no other mono azo dyes from naphtholsulfoacid 1.4 have been practically used for this purpose. The United States Patent No. 761123, it is true, describes some dyes and lakes from amidoanthraquinone and various naphtholsulfoacids among which also naphtholsulfoacid 1.4 is mentioned, but those dyes from anthraquinone proved to be of no importance for the manufacture of lakes. Moreover the unserviceableness of dyes from naphtholsulfoacid 1.4 for the manufacture of lakes has been known by the Germant Patent 161,424 (English Patent No. 4646/05). This patent describes lakes from various dyes, one compound of which being naphtholdisulfoacid 1.4.8 and the inventor of them expressly declares that by replacing the naphtholdisulfoacid 1.4.8 by the very similar naphtholsulfoacid 1.4 the lakes produced are far less fast against light and of inferior quality.

All those mono azo dyes from naphtholsulfoacid mentioned being practically unadapted or unserviceable for useful colorlakes and having furthermore experienced that the dye produced from diazotized beta-naphthylamin and naphtholsulfoacid 1.4 yields lakes which are dull, not fast against light, and therefore equally worthless, I was much surprised when I found that my new lakes—produced from diazotized alpha-naphthylamin and naphtholsulfoacid 1.4 were of so high quality.

The manner in which my lakes are obtained from the dye produced from diazotized alpha-naphthylamin and naphtholsulfoacid 1.4 is in using the usual methods in order to obtain colorlakes from dyes say as follows:

Example 1: A paste containing 2.5 kg. of the dry sodium salt of the dye diazotized alphanaphthylamin and naphtholsulfoacid 1.4 obtained by known methods, is stirred with water and 100 kg. of heavy spar added; then a solution of ½ kg. of calcium chlorid in 10 liters of water is added and boiled for a few minutes. The colorlake obtained is of a beautiful Bordeaux-red shade and the oil colors made from it are highly fast against light and of an excellent covering capacity.

Example 2: The process is carried out exactly as in Example 1 but instead of ½ kg. of calcium chlorid 1 kg. of barium chlorid is used. The barium lake obtained is of same quality but more bluish than the calcium lake obtained by Example 1.

In manufacturing my new lakes by the above processes instead of heavy spar, other substrata employed for colorlakes such as aluminium hydroxid, blanc fixe, etc., may be used. The manufacture of my new lakes may also be carried out under such conditions that the dyes form simultaneously with the precipitation of the lakes as shown in U. S. Patent No. 910,030.

I claim:—

1. A process for the manufacture of color-lakes which consists in treating the dye produced from diazotized alpha-naphthylamin and naphtholsulfo-acid 1.4, with salts of heavy metals.

2. As new articles of manufacture, color-lakes obtained from the dye produced from diazotized alpha-naphthylamin and naphtholsulfoacid 1:4, characterized by their Bordeaux-red shade, their resistance to water and alcohol, their insolubility in oil and their fast color against the action of light, yielding, upon reduction by means of tin and hydrochloric acid, alpha-naphthylamin and 2 amido 1 naphthol 4 sulfonic acid.

3. As a new article of manufacture, a color-lake obtained from the calcium salt of the dye produced from diazotized alpha-naphthylamin and naphtholsulfoacid 1:4, characterized by its Bordeaux-red shade, its resistance to water and alcohol, its insolubility in oil and its fast color against the action of light, yielding, upon reduction by means of tin and hydrochloric acid, alpha-naphthylamin and 2 amido 1 naphthol 4 sulfonic acid.

In witness whereof I have hereunto set my hand in the presence of two witnesses.

ERNST ULRICHS. [L. S.]

Witnesses:
ALFRED HENKEL,
ALBERT F. NIEFER.